(12) United States Patent
Fisher

(10) Patent No.: US 8,559,987 B1
(45) Date of Patent: Oct. 15, 2013

(54) WIRELESS BIDIRECTIONAL COMMUNICATIONS BETWEEN A MOBILE DEVICE AND ASSOCIATED SECURE ELEMENT

(75) Inventor: Michelle Fisher, Oakland, CA (US)

(73) Assignee: Blaze Mobile, Inc., Berkeley, CA (US)

(*) Notice: Subject to any disclaimer, the term of this patent is extended or adjusted under 35 U.S.C. 154(b) by 510 days.

(21) Appl. No.: 12/948,717

(22) Filed: Nov. 17, 2010

Related U.S. Application Data

(63) Continuation-in-part of application No. 11/933,321, filed on Oct. 31, 2007, now Pat. No. 8,275,312, which is a continuation-in-part of application No. 11/467,441, filed on Aug. 25, 2006, now abandoned.

(60) Provisional application No. 60/766,171, filed on Dec. 31, 2005, provisional application No. 60/766,172, filed on Dec. 31, 2005.

(51) Int. Cl.
*G06K 5/00* (2006.01)

(52) U.S. Cl.
USPC ...... 455/466; 455/41.1; 455/41.2; 455/556.1; 235/380; 340/5.4; 340/5.41; 705/41; 705/64

(58) Field of Classification Search
USPC .............. 455/41.1, 41.2, 466, 552.1, 556.1; 235/380; 340/5.4, 5.41; 705/41, 64
See application file for complete search history.

(56) References Cited

U.S. PATENT DOCUMENTS

| | | | | |
|---|---|---|---|---|
| 7,228,155 B2* | 6/2007 | Saunders | | 455/558 |
| 7,280,847 B2* | 10/2007 | Goldthwaite et al. | | 455/558 |
| 7,327,999 B2* | 2/2008 | Kang | | 455/406 |
| 7,554,570 B2* | 6/2009 | Benco et al. | | 348/14.01 |
| 7,697,894 B2* | 4/2010 | Zilliacus et al. | | 455/41.2 |
| 7,702,361 B2* | 4/2010 | Lai et al. | | 455/553.1 |
| 7,729,986 B1* | 6/2010 | Hoffman et al. | | 705/41 |
| 7,920,827 B2* | 4/2011 | Huomo et al. | | 455/41.1 |
| 7,997,476 B2* | 8/2011 | Gannon | | 235/379 |
| 8,019,365 B2* | 9/2011 | Fisher | | 455/466 |
| 8,170,527 B2* | 5/2012 | Granucci et al. | | 455/406 |
| 8,190,087 B2* | 5/2012 | Fisher et al. | | 455/41.2 |
| 8,275,312 B2* | 9/2012 | Fisher | | 455/41.2 |
| 8,290,443 B2* | 10/2012 | Stirling-Gallacher et al. | | 455/67.13 |
| 8,332,272 B2* | 12/2012 | Fisher | | 705/16 |
| 8,417,643 B2* | 4/2013 | Mardikar | | 705/67 |
| 8,447,836 B2* | 5/2013 | Mahalal et al. | | 709/219 |
| 2004/0127256 A1* | 7/2004 | Goldthwaite et al. | | 455/558 |
| 2004/0235450 A1* | 11/2004 | Rosenberg | | 455/406 |
| 2005/0222949 A1* | 10/2005 | Inotay et al. | | 705/40 |
| 2006/0079284 A1* | 4/2006 | Lu et al. | | 455/558 |
| 2006/0111053 A1* | 5/2006 | Wu et al. | | 455/90.3 |
| 2006/0253389 A1* | 11/2006 | Hagale et al. | | 705/39 |
| 2006/0287004 A1* | 12/2006 | Fuqua | | 455/558 |
| 2007/0075133 A1* | 4/2007 | Yeager | | 235/380 |
| 2007/0131759 A1* | 6/2007 | Cox et al. | | 235/380 |

(Continued)

*Primary Examiner* — Steven Kelley
(74) *Attorney, Agent, or Firm* — DLA Piper LLP (US)

(57) ABSTRACT

In some embodiments, a system includes a mobile communication device and a secure element physically coupled to the mobile communication device. The mobile communication device includes a first wireless transceiver, first processor, and first memory. The secure element includes a second wireless transceiver, second processor, and second memory. The mobile communication device is configured to transmit data via the first wireless transceiver to the secure element in packets, using a packet protocol. The secure element is configured to transmit data via the second wireless transceiver to the mobile communication device in messages, using a messaging protocol distinct from the packet protocol.

23 Claims, 12 Drawing Sheets

(56) References Cited

U.S. PATENT DOCUMENTS

| | | | |
|---|---|---|---|
| 2007/0152035 A1* | 7/2007 | Adams et al. | 235/380 |
| 2007/0162381 A1* | 7/2007 | Petralia et al. | 705/38 |
| 2007/0220494 A1* | 9/2007 | Spooner | 717/130 |
| 2007/0293155 A1* | 12/2007 | Liao et al. | 455/41.2 |
| 2008/0048022 A1* | 2/2008 | Vawter | 235/380 |
| 2008/0208742 A1* | 8/2008 | Arthur et al. | 705/41 |
| 2009/0012879 A1* | 1/2009 | Choi | 705/27 |
| 2009/0075592 A1* | 3/2009 | Nystrom et al. | 455/41.1 |
| 2009/0112765 A1* | 4/2009 | Skowronek | 705/44 |
| 2009/0182630 A1* | 7/2009 | Otto et al. | 705/14 |
| 2009/0281947 A1* | 11/2009 | Erel | 705/44 |
| 2010/0042546 A1* | 2/2010 | Humbel | 705/64 |
| 2010/0088188 A1* | 4/2010 | Kumar et al. | 705/17 |
| 2010/0280945 A1* | 11/2010 | Vago et al. | 705/41 |
| 2011/0022484 A1* | 1/2011 | Smith et al. | 705/17 |
| 2011/0047038 A1* | 2/2011 | Halevi | 705/17 |
| 2011/0151900 A1* | 6/2011 | Yu et al. | 455/466 |
| 2011/0165859 A1* | 7/2011 | Wengrovitz | 455/411 |
| 2012/0029990 A1* | 2/2012 | Fisher | 705/14.19 |
| 2012/0101943 A1* | 4/2012 | Park | 705/41 |
| 2012/0143707 A1* | 6/2012 | Jain | 705/18 |
| 2012/0196529 A1* | 8/2012 | Huomo et al. | 455/41.1 |
| 2013/0006872 A1* | 1/2013 | Chandoor et al. | 705/75 |

* cited by examiner

WIRELESS BIDIRECTIONAL COMMUNICATIONS BETWEEN A MOBILE DEVICE AND ASSOCIATED SECURE ELEMENT

RELATED APPLICATIONS

This application is a continuation-in-part of U.S. patent application Ser. No. 11/933,321, titled "Method and System for Adapting a Wireless Mobile Communication Device for Wireless Transactions," filed Oct. 31, 2007 now U.S. Pat. No. 8,275,312, which is a continuation-in-part of U.S. patent application Ser. No. 11/467,441, titled "Method and Apparatus for Completing a Transaction Using a Wireless Mobile Communication Channel and Another Communication Channel," filed Aug. 25, 2006 now abandoned, which claims priority to U.S. Provisional Patent Application No. 60/766,171 titled "Mobile Credit Card Account Installer" filed Dec. 31, 2005 and Application No. 60/766,172, titled "Mobile Ticket" filed Dec. 31, 2005. All of the above-referenced patent applications are incorporated by reference herein in their entirety.

TECHNICAL FIELD

The disclosed embodiments relate generally to wireless communications for a mobile device, and more particularly, to wireless communications between a mobile device and an associated secure element using multiple communication protocols.

BACKGROUND

A secure element can be physically coupled to a mobile communication device to allow for transactions with remote terminals such as point-of-sale and point-of-entry terminals. Implementing wireless communications between the mobile communication device and the secure element, however, presents challenges. For example, it is desirable to address messages transmitted between the mobile communication device and the secure element in a manner that allows for easy receipt of the messages. Also, a method of communication between the mobile communication device and the secure element should allow for convenient activation of the secure element and remote deactivation of the secure element.

SUMMARY

Disclosed embodiments allow a mobile communication device to communicate wirelessly with a secure element that is physically coupled to the mobile communication device. Communications from the mobile communication device to the secure element use a different protocol than communications from the secure element to the mobile communication device.

In some embodiments, a system includes a mobile communication device and a secure element physically coupled to the mobile communication device. The mobile communication device includes a first wireless transceiver, first processor, and first memory. The secure element includes a second wireless transceiver, second processor, and second memory. The mobile communication device is configured to transmit data via the first wireless transceiver to the secure element in packets, using a packet protocol. The secure element is configured to transmit data via the second wireless transceiver to the mobile communication device in messages, using a messaging protocol distinct from the packet protocol.

In some embodiments, a method of communicating between a mobile communication device and a secure element physically coupled to the mobile communication device is performed. The mobile communication device includes a first wireless transceiver, first processor, and first memory, and the secure element includes a second wireless transceiver, second processor, and second memory. The method includes wirelessly transmitting a packet from the mobile communication device, via the first wireless transceiver, to the secure element, using a packet protocol. The method also includes wirelessly transmitting a message from the secure element, via the second wireless transceiver, to the mobile communication device, using a messaging protocol distinct from the packet protocol.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1:
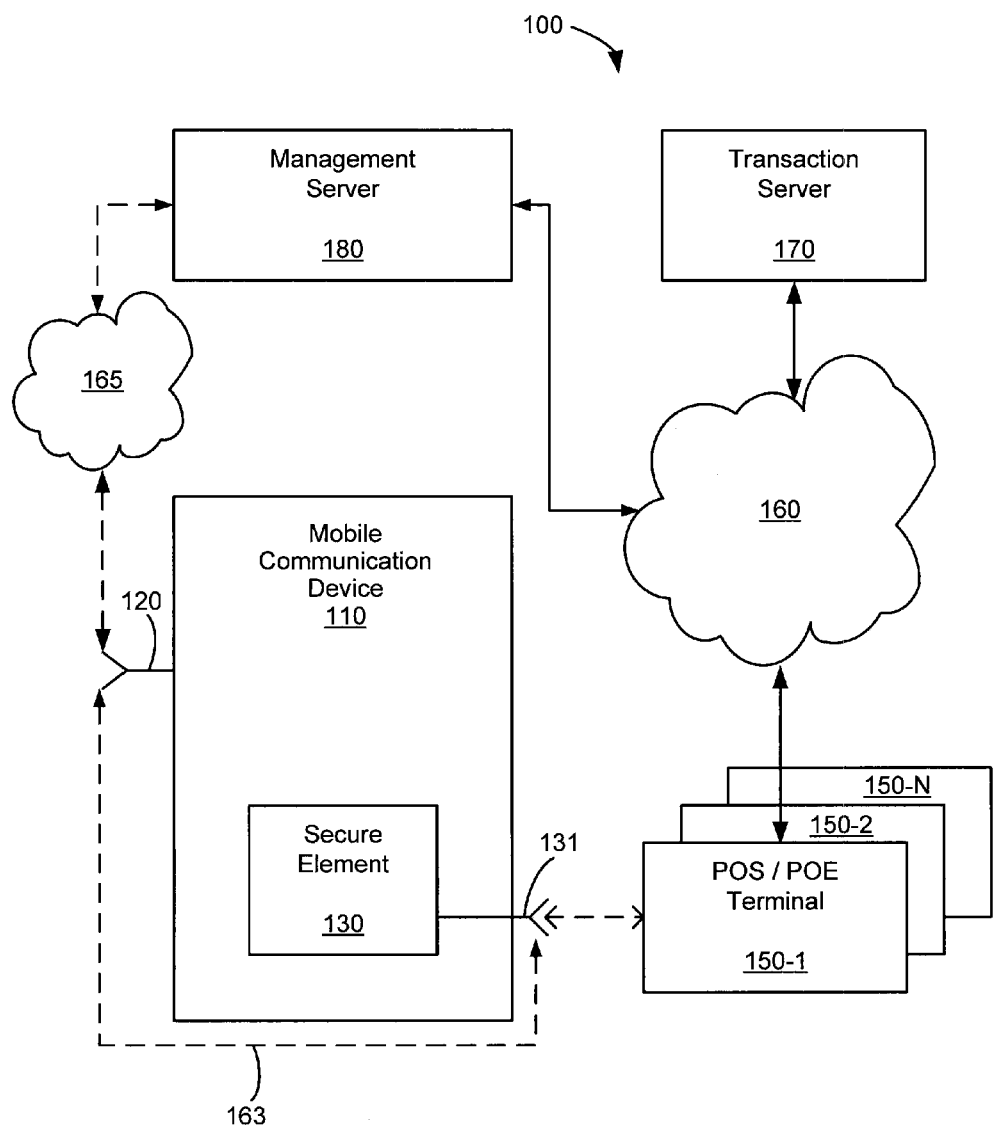
FIG. 1 is a block diagram illustrating a communication system in accordance with some embodiments.

FIG. 1 is a block diagram illustrating a communication system 100 in accordance with some embodiments. The communication system 100 includes a hand-held, wireless mobile communication device 110 with an antenna 120 for wireless communication. While the antenna 120 is shown as extending from the mobile communication device 110 for visual clarity, the antenna 120 may be implemented internally within the mobile communication device 110. Also, the mobile communication device 110 may include more than one antenna 120. The mobile communication device 110 includes a user interface for entering data. For example, a display 124 (FIG. 2) is a touch-screen display; alternatively or in addition, the mobile communication device 110 includes a keypad 125 (FIG. 2) for entering data.

A secure element 130 is physically coupled to the mobile communication device 110. In some embodiments, the secure element 130 is externally attached to the mobile communication device 110. For example, the secure element 130 is adhesively affixed or mechanically secured to the housing of the mobile communication device 110. Alternatively, the secure element 130 is housed within the mobile communication device 110. The secure element 130 includes an antenna 131 for wireless communication. While the antenna 131 is shown as extending from the secure element 130 for visual clarity, the antenna 131 may be implemented internally within the secure element 130. Also, the secure element 130 may include more than one antenna 131. Communication occurs wirelessly between the secure element 130 and the mobile communication device 110 via respective antennas 120 and 131, over a direct wireless channel 163 between the mobile communication device 110 and the secure element 130. Thus, in some embodiments, the channel 163 does not pass through a network.

The secure element 130 also can communicate wirelessly with different point-of-sale (POS) or point-of-entry (POE) terminals 150-1 to 150-N via the antenna 131. In some embodiments, a POS terminal 150 receives a transaction request signal from the secure element 130 and transmits the transaction request signal to a transaction server 170 over a network 160. Alternatively, a POE terminal 150 receives an entry request signal from the secure element 130 and transmits the entry request signal to the transaction server 170 over the network 160. The network 160 is any suitable wired and/or wireless network and may include, for example, a local area network (LAN), wide area network (WAN), virtual private network (VPN), the Internet, a metropolitan area network (MAN), or any combination of these or similar networks. The transaction server 170 verifies the request and forwards a verification signal to the management server 180 via the network 160. The management server 180 identifies the user corresponding to the verification signal and provides a response signal back to the mobile communication device 110, which the mobile communication device 110 receives via the antenna 120. The response signal thus is communicated back to the mobile communication device 110 using a communication channel that is different from the communication channel used to initiate the transaction. Alternatively, the response signal is communicated back to the mobile communication device 110 using communication channels from the management server 180 to the secure element 130 through the network 160 and POS terminal 150, and then from the secure element 130 to the mobile communication device 110 via the antennas 131 and 120.

In the example of an entry request signal received at a POE terminal 150, the entry request is verified by the POE terminal 150 or the transaction server 170, upon which the POE terminal 150 admits the user of the mobile communication device 110 to the corresponding venue or facility.

Figure 2:
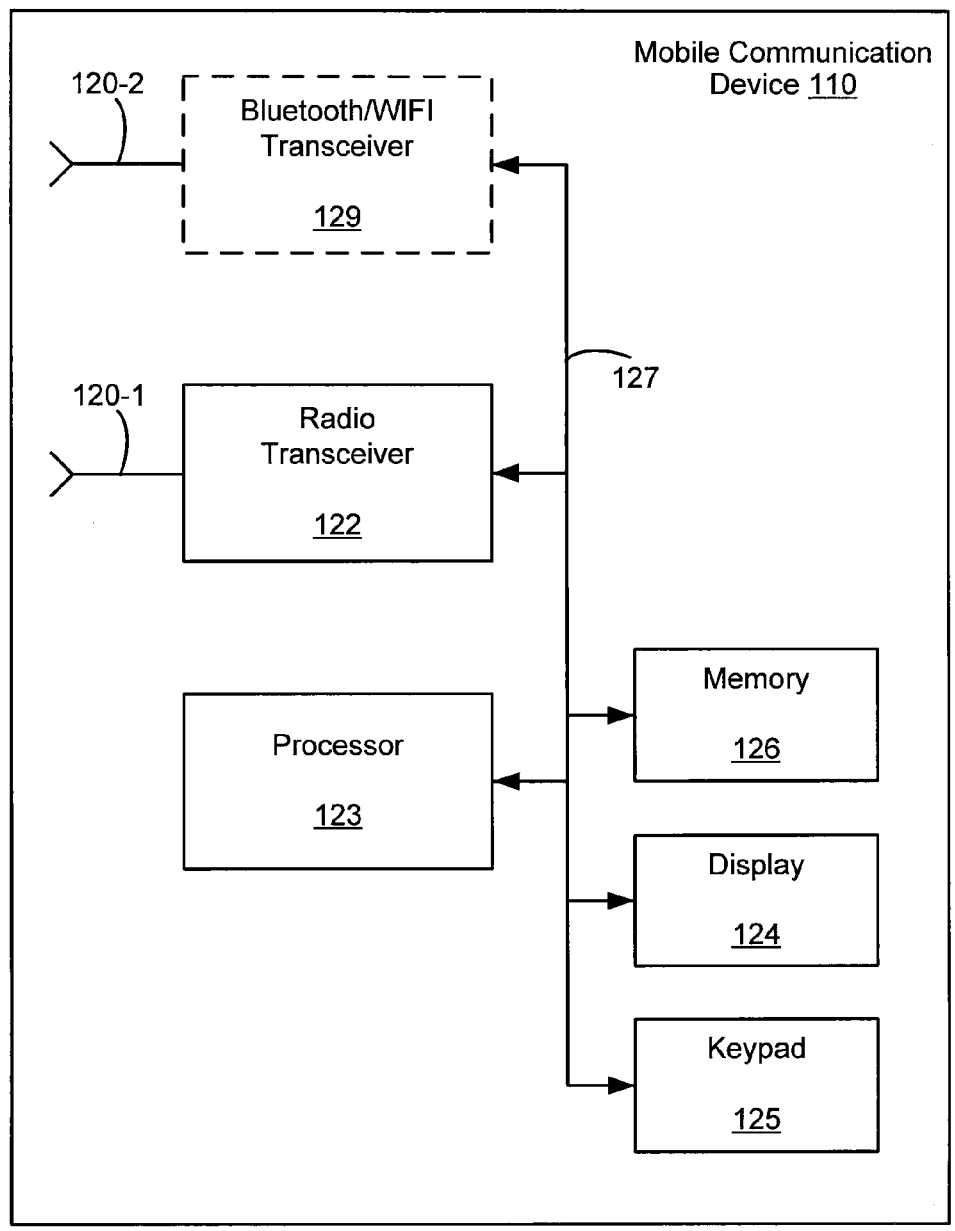
FIG. 2 is a block diagram illustrating selected elements of a mobile communication device in accordance with some embodiments.

FIG. 2 is a block diagram illustrating selected elements of the mobile communication device 110 in accordance with some embodiments. A processor 123 is coupled to a wireless radio transceiver 122, a display 124, a keypad 125, and a memory 126. The radio transceiver 122 is connected to an antenna 120-1, which is an example of an antenna 120 (FIG. 1) and is adapted to send outgoing voice and data signals and receive incoming voice and data signals over a radio communication channel. The radio communication channel can be a digital radio communication channel (e.g., a cellular channel as provided by a cellular service provider), such as a CDMA or GSM channel. Such a radio communication channel has the capacity to communicate both voice and data messages using conventional techniques. In some embodiments, the processor 123 also is coupled to a second wireless transceiver 129 (e.g., a Bluetooth or WiFi transceiver), connected to a corresponding antenna 120-2 (which is another example of an antenna 120, FIG. 1), for communicating with an external device over an additional communication channel separate from the radio communication channel associated with the transceiver 122.

Figure 6:
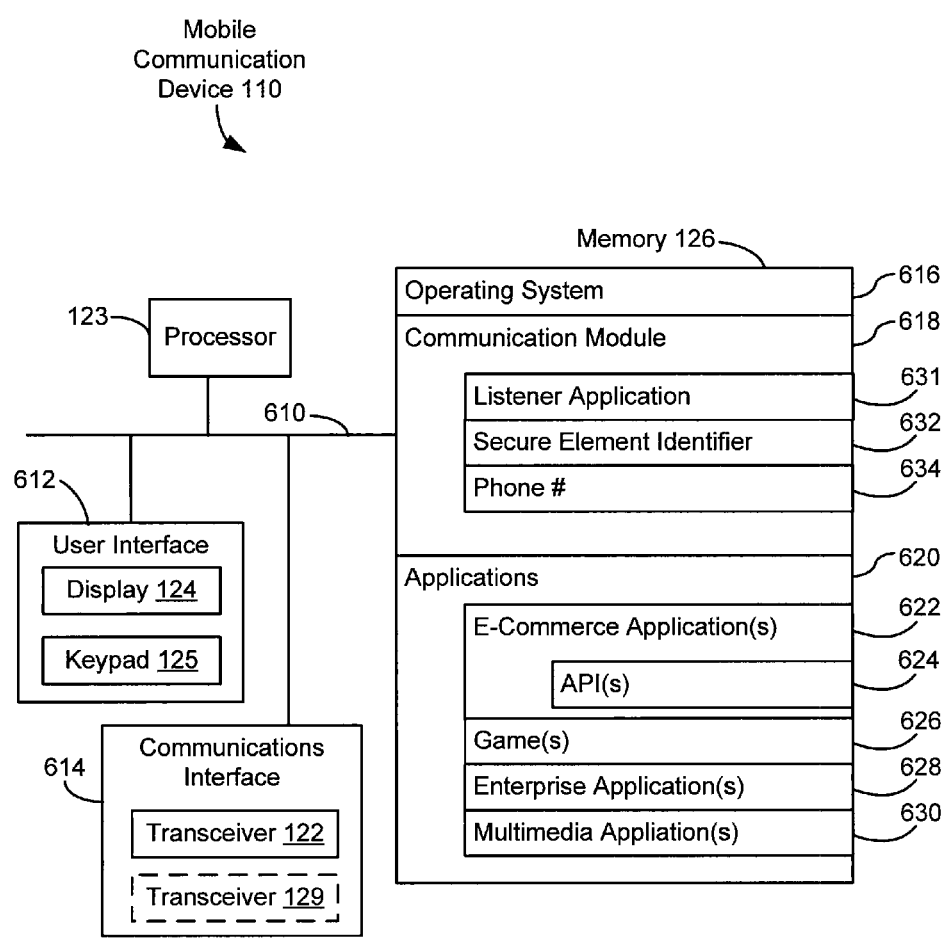
FIG. 6 is a block diagram illustrating selected elements of a mobile communication device in accordance with some embodiments.

The processor 123 has the capability to perform not only the radio communication services necessary to allow for phone and data communications (e.g., via the transceivers 122 and/or 129), but also to execute various application programs (e.g., applications 620, FIG. 6) that are stored in the memory 126. These application programs can receive inputs from the user via the display 124 and/or keypad 125. In some embodiments, application programs stored in the memory 126 and run on the processor 123 are, for example, iPhone, Android, Windows Mobile, BREW, J2ME, or other mobile applications and can encompass a broad array of application types. Examples of these applications include e-commerce applications 622 (FIG. 6), games 626 (FIG. 6), enterprise applications 628 (FIG. 6), and multimedia applications 630 (FIG. 6). E-commerce applications can include ticketing applications; content, item and service purchase applications; and/or payment management applications. One example of an e-commerce application that runs on the processor 123 and is stored in the memory 126 is an event application that provides event information and ticketing (e.g., for movies, concerts, sports, airplanes, busses, trains, etc). In some implementations, the processor 123 recognizes secure communications (e.g., as received via the transceiver 122 and/or 129) and transmits data from the secure communications to the secure element 130 for storage therein. The processor 123 also processes data received from the secure element 130.

Figure 3A:
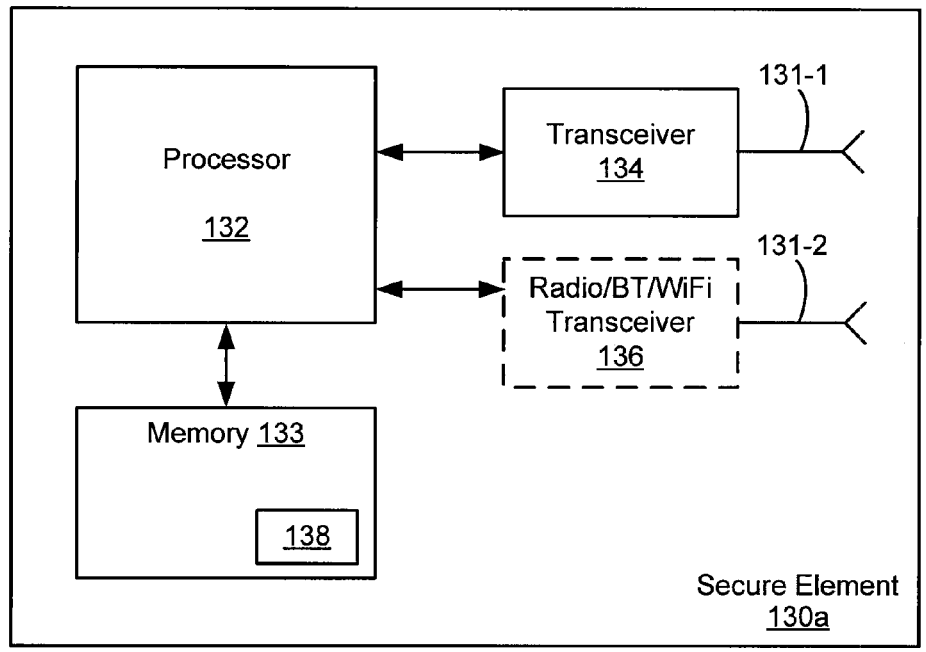
FIGS. 3A-3C are block diagrams illustrating a secure element to be physically coupled to a mobile communication device in accordance with some embodiments.

FIG. 3A is a block diagram illustrating a secure element 130a in accordance with some embodiments. The secure element 130a, which is an example of the secure element 130 (FIG. 1), includes a processor 132, a memory 133, and a wireless transceiver 134 with a corresponding antenna 131-1. The memory 133 includes a memory element 138 (e.g., a register, or alternatively a group of memory cells in a memory array in the memory 133) for storing an identifier (e.g., a serial number) associated with the secure element 130a. The memory element 138 is non-volatile and thus can store the identifier even in the absence of power. The transceiver 134 is adapted to communicate wirelessly with POS and POE terminals 150 (FIG. 1). For example, the transceiver 134 is adapted to send transaction request signals to POS terminals 150, to send entry request signals to POE terminals 150, and to receive corresponding responses from the terminals 150. In some embodiments, the transceiver 134 is a near-field communication (NFC) transceiver (e.g., operating in accordance with the ISO 18092 standard), which includes an NFC modem. In some implementations, the NFC modem has a set of registers that can be read and written by the processor 132 and are also available for reading and writing by an external device (e.g., a POS or POE terminal 150) over the wireless (e.g., RFID) communications channel between the transceiver 134 and the external device. This set of registers serves, for example, as a shared memory between the processor 132 within the secure element 130 and an RFID reader associated with a POS or POE terminal 150. This communication between the secure element 130a and POS or POE terminal 150 is performed, for example, in accordance with the ISO 14443A/B standard and/or the ISO 18092 standard.

In some embodiments, the secure element 130a includes one or more additional transceivers 136 (e.g., radio, Bluetooth, and/or WiFi transceivers) and associated antennas 131-2. The one or more additional transceivers 136 are adapted to communicate wirelessly with the mobile communication device 110 (e.g., via the transceiver 122 and/or 129 (FIG. 2) in the mobile communication device 110).

The memory 133 stores one or more applications, including one or more e-commerce applications (e.g., applications 720, FIG. 7), to be executed by the processor 132. Associated with respective e-commerce applications are respective application programming interfaces (APIs) for interacting with corresponding applications run on the processor 123 in the mobile communication device 110 (FIG. 2) and with POS or POE terminals 150 (FIG. 1). Examples of such interactions are provided below with respect to FIGS. 4A-4D.

In some embodiments, the mobile communication device 110 establishes a point-to-point connection with the secure element 130 via the wireless channel 163 (FIG. 1) using Point-to-Point Protocol (PPP). Using PPP, the mobile communication device 110 tunnels packets (e.g., IP packets) to the secure element 130. After transmission of the packets is complete and acknowledgements confirming the packets have been received from the secure element 130, the PPP connection is disabled. Alternatively, Transmission Control Protocol/Internet Protocol (TCP/IP) is used to tunnel the packets from the mobile communication device 110 to the secure element 130. In other embodiments, the mobile communication device 110 establishes a Virtual Private Network (VPN) or a General Packet Radio Service (GPRS) connection with the secure element 130, which is used to tunnel the packets. In still other embodiments, the mobile communication device 110 uses WiFi, Bluetooth, ZigBee (i.e., the IEEE 802.15.4-2003 standard), or non-directed infrared to transmit the packets (e.g., via the transceiver 129, FIG. 2) to the secure element 130 and thus to communicate with the secure element 130. In some embodiments, the secure element 130 also uses WiFi, Bluetooth, ZigBee, or non-directed infrared, respectively, to communicate with the mobile communication device 110.

Figure 3B:
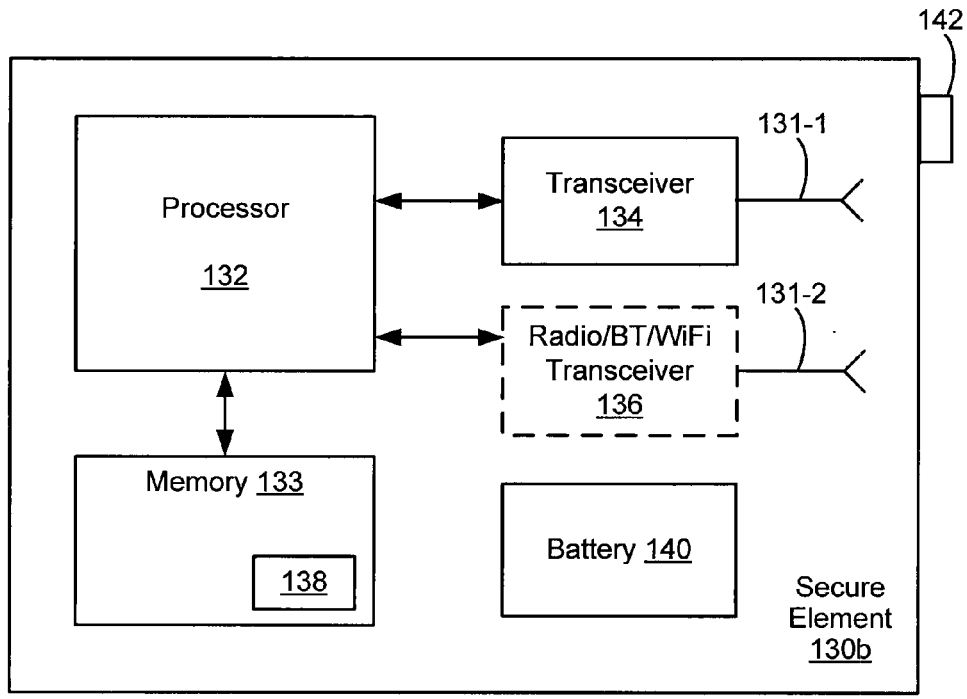
Figure 3C:
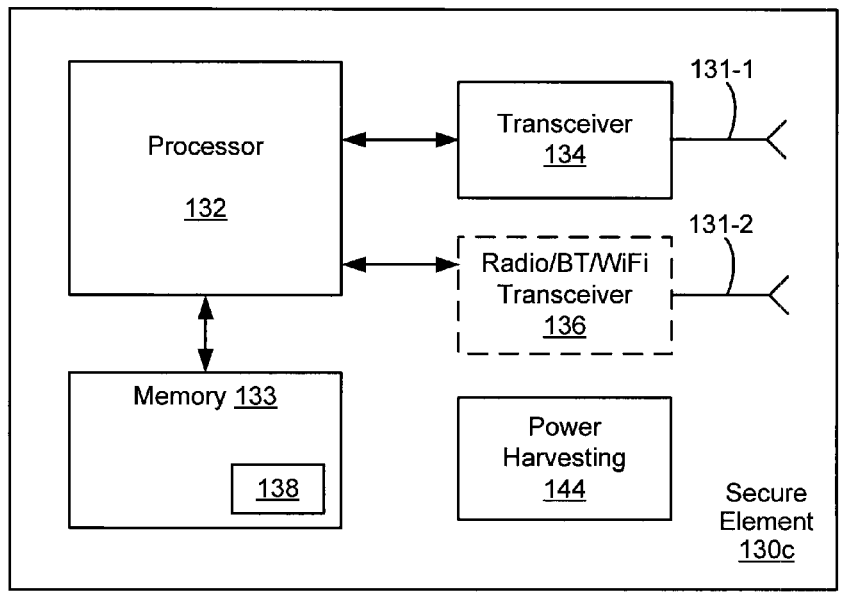

In some embodiments, the mobile communication device 110 transmits data to the secure element 130 over the direct wireless channel 163 (FIG. 1) using a first communications protocol, while the secure element 130 transmits data to the mobile communication device 110 over the direct wireless channel 163 (FIG. 1) using a second communications protocol distinct from the first protocol. For example, the device 110 transmits data to the secure element 130 using a packet protocol (e.g., Internet Protocol (IP)) in which an identifier of the secure element 130 (e.g., as stored in the memory element 138, FIGS. 3A-3C, and also in the memory 126, FIG. 2) is used as a local, private IP address for the secure element 130. The processor 123 in the device 110 (FIG. 2) creates packets with the identifier as a destination address and the data as the packet's payload, and delivers the packets to the transceiver 122 or 129, which transmits the packets to the secure element 130. The secure element 130 receives the packets via the transceiver 134 or 136, which provides the packets to the processor 132 (FIGS. 3A-3C). The processor 132 disassembles the packets and processes the data contained in the packets. In some embodiments, however, transmissions from the secure element 130 to the device 110 do not use the packet protocol. Instead, for example, the secure element 130 uses a messaging protocol. Examples of messaging protocols include Short Message Service (SMS) and Multimedia Messaging Service (MMS). The processor 132 (FIGS. 3A-3C) in the secure element 130 creates messages addressed to the phone number associated with the device 110 and provides the messages to the transceiver 134 or 136, which transmits the messages to the device 110. In some implementations, the messages are SMS messages with 132 or fewer characters. The device 110 receives the messages at the transceiver 122 or 129 and provides the messages to the processor 123, which extracts and processes the data contained in the messages. The device 110 typically includes multiple ports associated with the transceiver 122. In some embodiments, the device 110 receives the messages from the secure element 130 via a port of the transceiver 122 that is separate from a port of the transceiver 122 used to receive messages (e.g., SMS or MMS messages) transmitted to the device 110 over a carrier network (e.g., a cellular network). The use of different protocols depending on the direction of communication between the device 110 and secure element 130 allows communications to be addressed using readily available information: the identifier of the secure element 130 and the phone number of the device 110. In some embodiments, the mobile communication device uses Dual Transfer Mode (DTM) to transmit the packets at a frequency different from a frequency used for cellular communication.

In some embodiments, standard AT commands are used in the secure element 130 and the mobile communication device 110. An API in the secure element 130 uses AT commands to create and transmit messages (e.g., SMS or MMS messages) to a specified port number associated with the radio transceiver 122 of the mobile communication device 110. The messages are sent directly from the secure element 130 to the mobile communication device 110 via the channel 163, (e.g., using a PPP connection or other connection). Alternatively, if the API in the secure element 130 determines that a carrier network (e.g., a cellular network) or wireless (e.g., WiFi) network is available, the API will detect this and format the messages for delivery over the network (e.g., using Http, https) to a Short Message Service Center (SMSC) (or other message service center) and then to the mobile communication device 110 and/or the management server 180. For example, the API composes the SMS packets such that they are compliant with standard SMS protocol which includes a unique 5 digit shortcode approved by an authorized shortcode agency.

In some embodiments, the secure element 130, while physically coupled to the mobile communication device 110, is not electrically coupled to the device 110 and does not receive power from the device 110. Instead, for example, the secure element 130a receives RF power from a remote terminal (e.g., a POS or POE terminal 150) when in proximity to the remote terminal and uses this power to operate the processor 132, memory 133, and transceivers 134 and 136. In the absence of another power source, the secure element 130a thus communicates with the mobile communication device 110 only when receiving power from a remote terminal. In some embodiments, a secure element 130b includes the components of the secure element 130a and also includes a battery 140, as shown in FIG. 3B. The battery 140 is charged inductively (e.g., using a power mat), which allows the battery 140 to be encased within the housing or body of the secure element 130*b*. In some embodiments, the battery 140 is surrounded by or encased in RF shielding to prevent interference with antennae in the secure element 130. The secure element 130*b* also may include one or more light-emitting diodes (LEDs) 142 to indicate a charge status of the battery 140. In other embodiments, a secure element 130*c* includes the components of the secure element 130*a* and also includes power harvesting circuitry 144, as shown in FIG. 3C. The power harvesting circuitry 144 harvests power from ambient radio-frequency (RF) signals and uses the harvested power to power the other components of the secure element 130*b*. In some embodiments, a secure element 130 includes both a battery 140 and power harvesting circuitry 144; the power harvesting circuitry 144 is used to recharge the battery. In FIGS. 3B and 3C, the power bussing between the battery 140 (FIG. 3B) or power harvesting circuitry 144 (FIG. 3C) and other components is not shown, for visual clarity.

In some embodiments, the components of the secure element 130*a* are implemented on a single integrated circuit (IC); this single integrated circuit is sometimes referred to as a smart chip. The smart chip and any other components (e.g., the battery 140, FIG. 3B, or power harvesting circuitry 144, FIG. 3C) of the secure element 130 are encased within a card, referred to as a smart card, that serves as a housing of the secure element 130. In some embodiments, the smart card is adhesively affixed to the mobile communication device 110 and is referred to as a sticker.

Figure 3D:
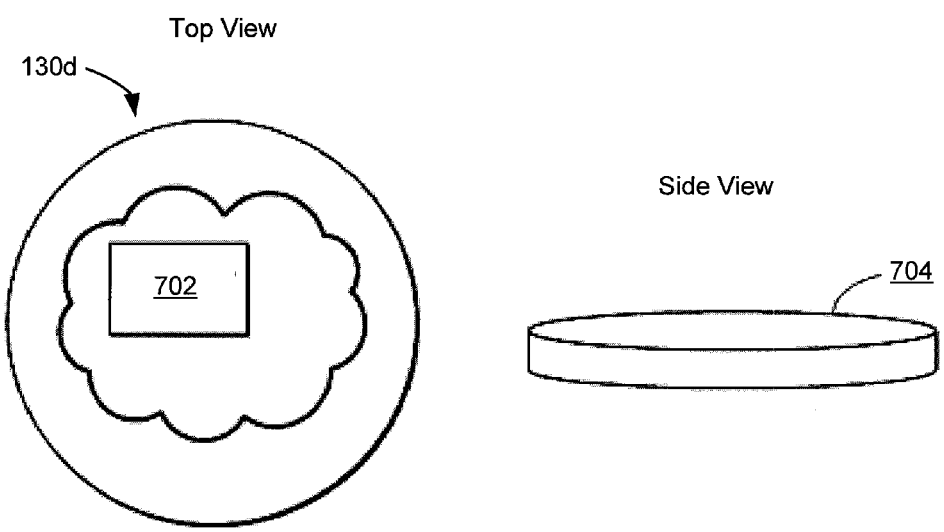
FIG. 3D illustrates top and side views of a smart card that can be attached externally to a mobile communication device in accordance with some embodiments.

FIG. 3D illustrates top and side views of a smart card 130*d*, which is an example of a secure element 130 (FIG. 1). The smart card 130*d* can be attached (e.g., affixed) externally to a mobile communication device 110. In FIG. 3D, the smart card 130*d* has a circular shape. The smart card 130*d* can have other suitable shapes (e.g., rectangular, triangular, and so on). The smart card 130*d* includes an embedded smart chip 702 that includes the components of the secure element 130*a* (FIG. 3A). The smart chip 702 is capable of 2-way wireless communication with a remote terminal (e.g., a POS or POE terminal 150) and with the mobile communication device 110 using the transceivers 134 or 136.

In some embodiments, the transceivers 134 and/or 136 in the smart chip 702 are low-power RF transceivers. Their low power output makes them susceptible to RF interference from neighboring devices, such as the mobile communication device 110 to which the smart card 130*d* is attached. Thus, in some implementations, the smart card 130*d* includes an RF shield to insulate the smart chip 702 from external interference. In one implementation, a lining of the smart chip 702 is composed of an RF absorbent material. In general, each phone has different levels of interference, and a material, size and thickness of the RF lining can determine an effectiveness of the RF shield. Alternatively, instead of incorporating an RF shield within the smart card 130*d*, an RF shield can be placed between the smart card 130*d* and the mobile communication device 110.

Given the abuse a mobile communication device 110 can take, smart cards 130*d* that are attached externally to a mobile communication device are designed to withstand some abuse. In some embodiments, the smart card 130*d* includes a ruggedized shell 704 that encases the smart chip 702. In some implementations, the shell 704 is formed of a composite plastic or polymer. The shell 70 can be hard (and substantially inflexible) or soft (and pliable). In some implementations, the shell 704 includes a protective membrane for the smart chip 702 which prevents damage to internal circuitry of the smart chip 702, a surface to adhere to an RF lining and/or the mobile communication device 110 with appropriate adhesive, and a surface that faces outward when the smart card 130*d* is attached to the mobile communication device 110, on which to print branding and advertising. Types of adhesives that can be used to affix the smart card 130*d* to the mobile communication device 110 include, for example, paper glue, super glue, adhesive polymers, and the like. In one implementation, the shell 704 has a maximum width (or diameter) of 25 mm, and has a maximum thickness (or depth) of 5 mm.

Figure 3E:
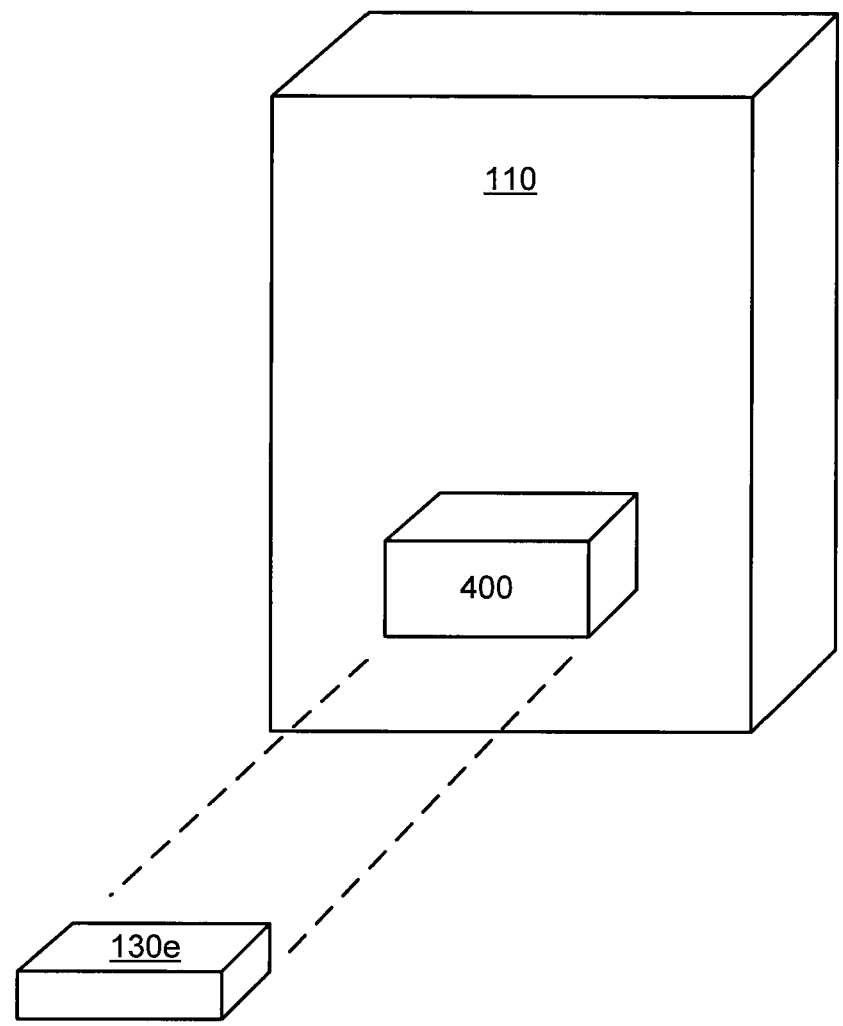
FIG. 3E illustrates a mobile communication device with a slot for receiving a secure element in accordance with some embodiments.

In some embodiments, instead of being externally attached to the mobile communication device 110, a secure element 130 is physically coupled to the mobile communication device 110 by being disposed internally within a body of the mobile communication device 110. For example, as shown in FIG. 3E in accordance with some embodiments, the mobile communication device 110 includes a slot 400 into which a secure element 130*e* is inserted. The secure element 130*e* is an example of a secure element 130*a*, 130*b*, or 130*c* (FIGS. 3A-3C). Even though the secure element 130*e* is physically housed within the slot 400, the secure element 130*e* and the mobile communication device 110 still communicate wirelessly with each other. Accordingly, in some implementations the slot 400 only provides for physical insertion and mechanical connection of the secure element 130*e* to the body of the mobile communication device 110, and does not electrically couple the secure element 130*e* to the mobile communication device 110.

Attention is now directed to methods of communication between various elements of the system 100 (FIG. 1), including the mobile communication device 110 and the secure element 130. FIGS. 4A through 4D illustrate examples of transactions involving the mobile communication device 110, the secure element 130, and other elements of the system 100.

Various operations shown in FIGS. 4A-4D, including operations 430 (FIG. 4B), 452 (FIG. 4C), 468 (FIG. 4D), and 476 (FIG. 4D), involving sending messages from the secure element 130 to the mobile communication device 110. In some embodiments, these messages are addressed to the phone number and/or an identifier of the device 110 and also are directed to a specified port of the device 110 (e.g., a specified port of the transceiver 122), which may be distinct from the port (e.g., of the transceiver 122) that the device 110 uses to receive messages via a carrier network (e.g., from a cellular provider). In some embodiments, these messages are generated using standard modem AT commands. The transceiver 134 or 136 (FIGS. 3A-3C) transmits the messages. In some embodiments, if an API running on the processor 132 of the secure element 130 detects that a carrier network or other wireless network is available, the API formats the messages to comply with a standard messaging protocol (e.g., standard SMS or MMS protocol) and the messages are delivered from the secure element 130 using the carrier network to the mobile communication device 110 and/or the management server 180 (e.g., using http, https, etc.). The messages may include a numeric shortcode (e.g., a 5-digit shortcode) approved by an authorized shortcode agency. Alternatively, the messages are transmitted directly from the secure element 130 to the mobile communication device 110 via the channel 163 (FIG. 1) (e.g., using a PPP or other connection between the secure element 130 to the mobile communication device 110).

In some embodiments, the messages include a character in the first position of the message to indicate that the message originated from the secure element 130. The first character may be calculated as a function of an identifier (e.g., serial number) of the secure element 130 and of a second number, such as the date. For example, the digits of the date are added together to provide an index value, and the digit of the identifier specified by the index value is used as the first character. In one example, if the date is Oct. 15, 2010, the index value is 1+5=6, and the 6th digit of the identifier is used as the first character.

Examples provided in the following description of FIGS. 4A-4D describe embodiments in which packets transmitted from the mobile communication device 110 to the secure element 130 use a different protocol than the messages transmitted from the secure element 130 to the mobile communication device 110. For example, the packets are IP packets (e.g., 128 byte IP packets), while the messages are SMS (e.g., 130 character SMS) or MMS messages. In other embodiments, however, the messages are packets formatted using the same protocol as the packets from the device 110. For example, an API in the secure element 130 creates IP packets (e.g., 128 byte IP packets) as the messages and transmits them to the device 110 via the wireless channel 163, using a connection (e.g., a PPP, VPN, or GPRS connection) established between the device 110 and the secure element 130. The IP packets created by the API in the secure element 130 are addressed to an IP address associated with a transceiver in the device 110. In still other embodiments, SMS or MMS packets are used in both directions for communications between the mobile communication device 110 and the secure element 130. In such embodiments, the secure element 130 includes a "listener" application to listen for messages from the device 110. Each message includes, for example, a shortcode approved by an authorized agency and an identifier in the first position of the message to indicate the origin of the message and distinguish the message from other messages.

In some embodiments, the secure element 130 selects a protocol to be used for a data transmission to the mobile communication device 110 based on the amount of data to be transmitted. For example, if the data can be transmitted using a predefined number of characters or less (e.g., 130 characters or less), the data are transmitted in an SMS message or similar message. If the data requires more than the predefined number of characters, the data is transmitted in a packet (e.g., a 128-byte IP packet).

Figure 4A:
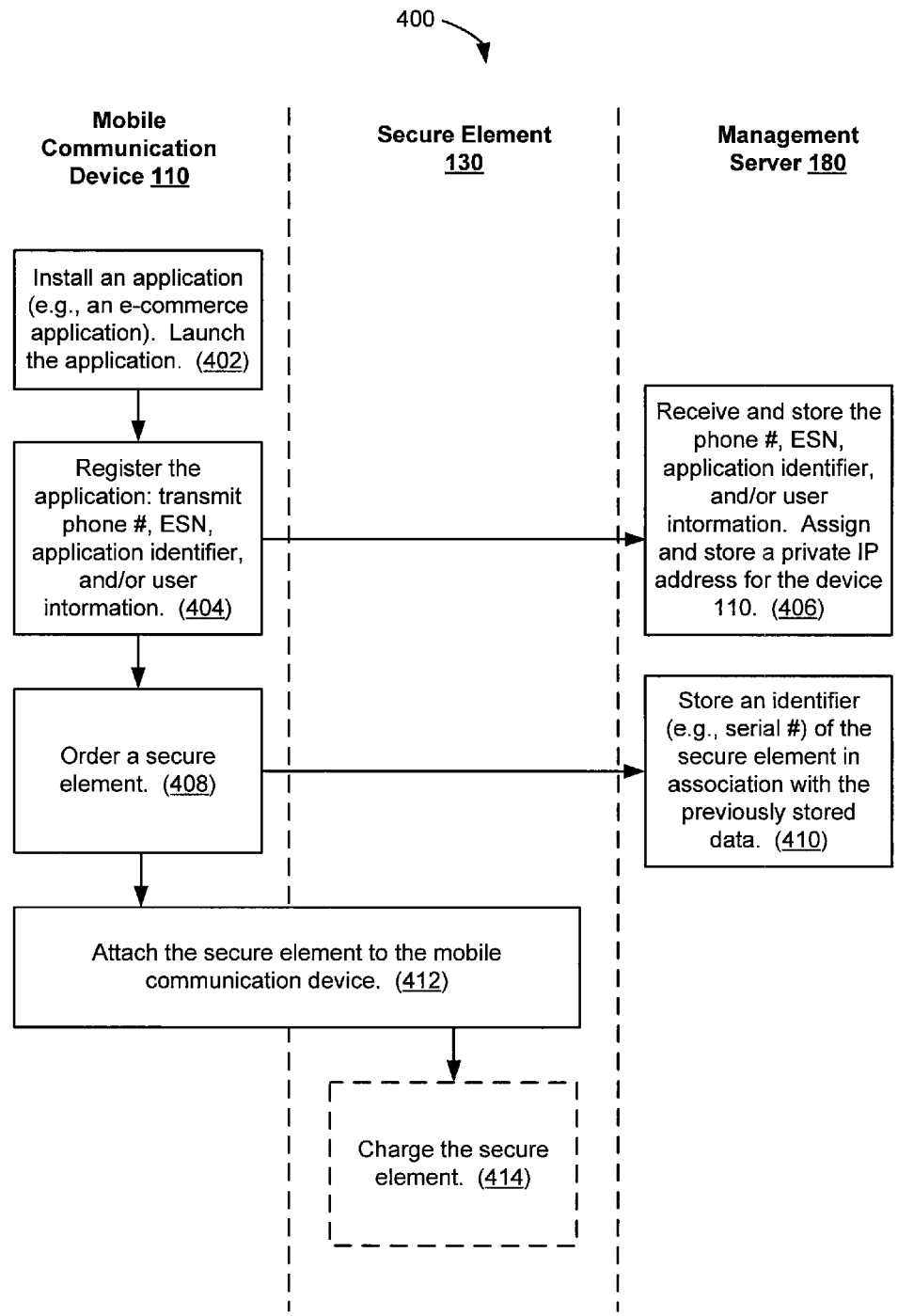
FIG. 4A is a flow diagram illustrating a method of installing a secure element in accordance with some embodiments.

FIG. 4A is a flow diagram illustrating a method 400 of installing a secure element 130 in accordance with some embodiments. In the method 400, an application (e.g., an application 620, such as an e-commerce application 622, FIG. 6) is installed (402) on the mobile communication device 110 by storing the application in the memory 126 (FIG. 2). The application is launched (402), thus initiating execution of the application by the processor 123 (FIG. 2). The user of the application registers (404) the application: in response to an instruction to register the application, the application transmits to the management server 180 (FIG. 1) the phone number and electronic serial number (ESN) of the mobile communication device 110, along with an identifier of the application and/or user information. This information is transmitted, for example, in one or more packets addressed to the management server 180, as created by the processor 123 and transmitted via the transceiver 122 or 129 (FIG. 2). The management server 180 receives and stores (406) this information. In some embodiments, the management server 180 also assigns and stores a private IP address for the mobile communication device 110, which serves as an identifier for the device 110.

The user orders (408) a secure element 130. The order is placed, for example, using the application. The management server 180 stores (410) an identifier of the secure element 130 to be provided to the user. For example, the management server 180 stores (410) a serial number of a smart chip 702 (FIG. 3D) in a smart card 130d to be provided to the user. Alternatively, the user obtains the secure element 130 and enters a code printed on the secure element 130 into the application, which transmits the code to the management server 180, where it is stored. The management server 180 uses the code to look up the identifier (e.g., the serial number) of the secure element 130. The identifier (e.g., the serial number) of the secure element 130 will serve as an address (e.g., a private internet protocol (IP) address) of the secure element 130; packets sent from the mobile communication device 110 to the secure element 130 will be addressed to this address. In some embodiments, the serial number of the secure element 130 is 128 bits and the private IP address of the secure element 130 is the serial number.

Upon receiving the secure element 130, the user attaches (412) the secure element 130 to the mobile communication device 110. For example, the user adhesively affixes a smart card 130d (FIG. 3D) to the mobile communication device 110. In another example, the user inserts a secure element 130e (FIG. 3E) into a slot 400 in the mobile communication device 110. If the secure element 130 includes a battery 140 (FIG. 3B), the battery 140, and thus the secure element 130, is charged (414).

Figure 4B:
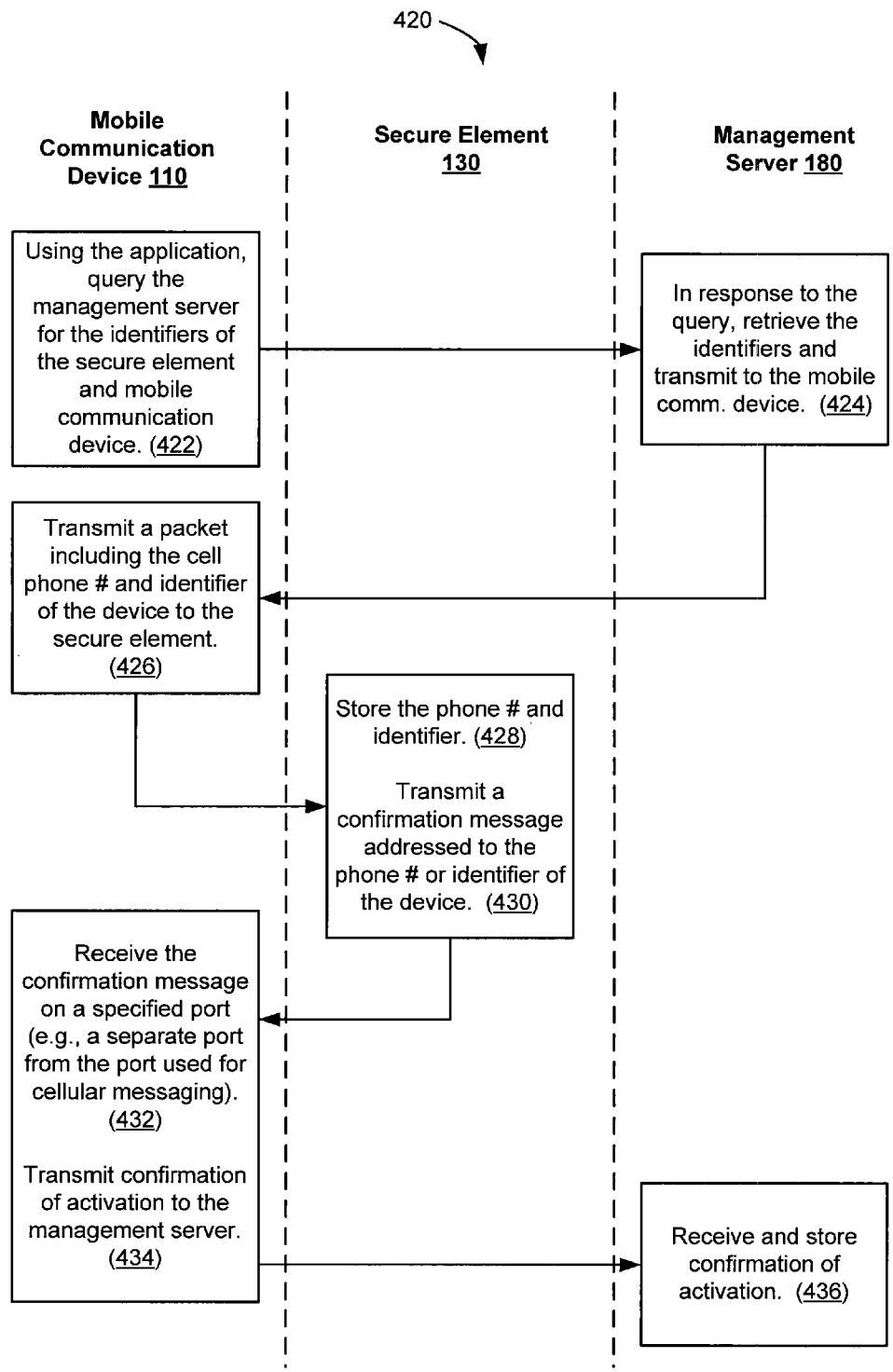
FIG. 4B is a flow diagram illustrating a method of activating a secure element in accordance with some embodiments.

After the secure element 130 has been installed in accordance with the method 400, the secure element 130 is activated. FIG. 4B is a flow diagram illustrating a method 420 of activating a secure element 130 in accordance with some embodiments. In the method 420, the user uses the application running on the processor 123 (FIG. 2) to query (422) the management server 180 for the identifier of the secure element 130 and, in some embodiments, the mobile communication device 110. In response, the management server 180 retrieves the stored identifier(s) and transmits (424) the identifier(s) to the mobile communication device 110.

At the mobile communication device 110, the processor 123 creates a packet (e.g., an IP packet), addressed to the identifier of the secure element 130, that includes the phone number (e.g., cellular phone number) and, in some embodiments, the identifier of the mobile communication device 110. The packet is transmitted (426) via the transceiver 122 or 129 (FIG. 2). The secure element 130 receives the packet via the transceiver 134 or 136 (FIGS. 3A-3C) and verifies that the packet is addressed to the secure element 130 by comparing the packet's address to the identifier stored in the memory element 138. An API running on the processor 132 (FIGS. 3A-3C) disassembles the packet and stores (428) the phone number and identifier of the mobile communication device 110 as provided by the packet in the memory 133. For example, the phone number is stored in another memory element of the memory 133, distinct from the memory element 138.

The API running on the processor 132 creates a message (e.g., an SMS or MMS message) confirming that the secure element 130 received the packet transmitted in operation 426. The message is transmitted (430) by the transceiver 134 or 136 (FIGS. 3A-3C).

The mobile communication device 110 receives (432) the confirmation message at the specified port of the transceiver 122 (FIG. 2). A "listener" application (e.g., 631, FIG. 6) on the device 110 listens on the specified port for the message and, upon receiving the message, unpacks it. If the mobile device does not receive the confirmation message, it retransmits the packet as described in operation 426. After receiving the confirmation, the device 110 then composes a message compliant with the format used for delivery (e.g., via a public carrier network) to the management server 180 and transmits (434) the confirmation of activation of the secure element 130 to the management server 180, which receives (436) and stores the confirmation of activation of the secure element 130.

Figure 4C:
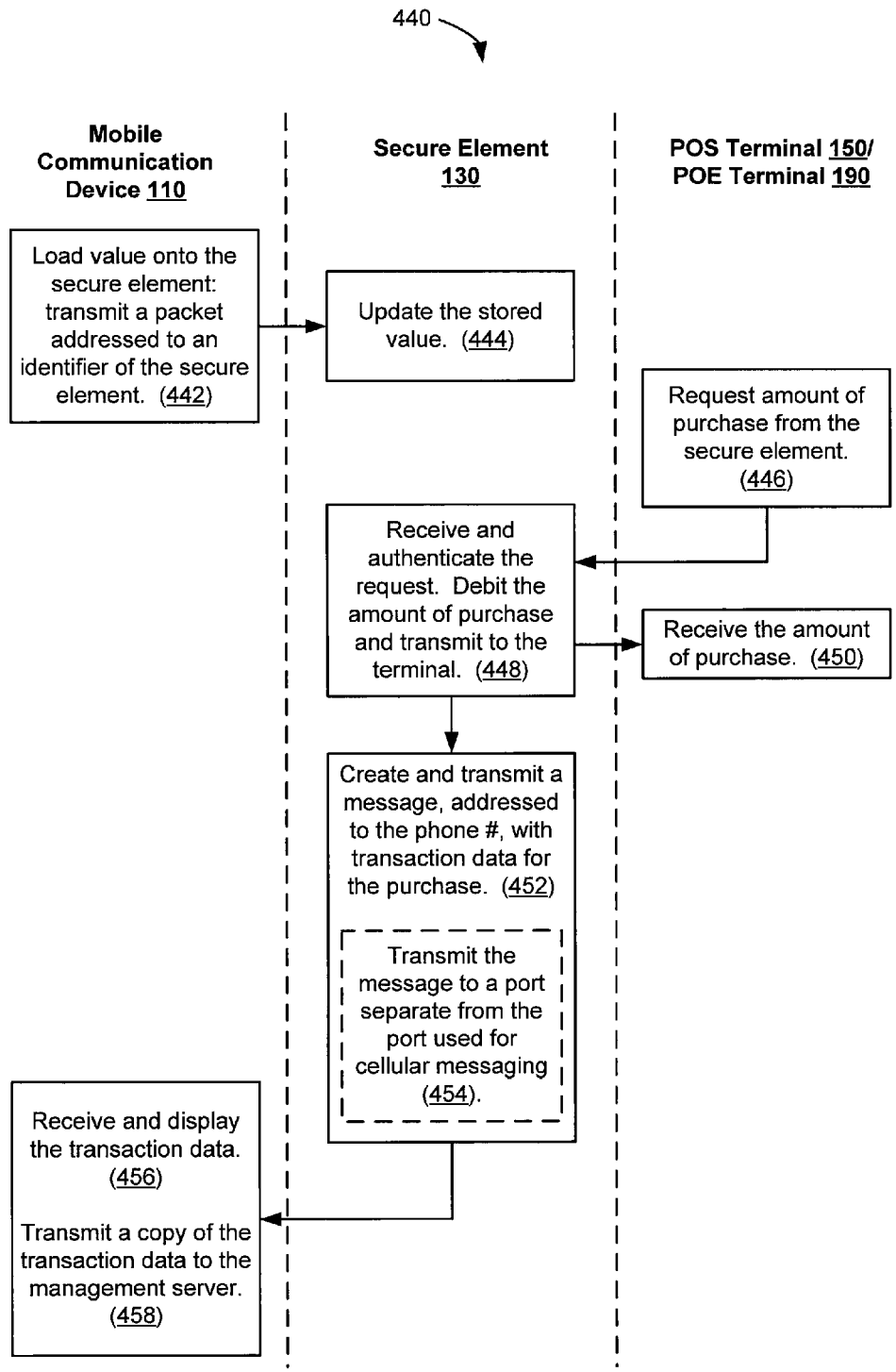
FIG. 4C is a flow diagram illustrating a method of using a secure element for a purchase in accordance with some embodiments.

Once the secure element 130 has been activated and its activation confirmed in accordance with the method 420, the secure element 130 may be used for purchases at terminals such as a POS or POE terminal 150 (FIG. 1). FIG. 4C is a flow diagram illustrating a method 440 of using a secure element 130 for a purchase in accordance with some embodiments.

In the method 440, the user instructs an application running on the processor 123 (FIG. 2) of the mobile communication device 110 to load (442) value (e.g., money or credits) onto the secure element 130. The application creates one or more packets (e.g., one or more IP packets), addressed to the identifier of the secure element, specifying the value to be loaded onto the secure element 130; the packet(s) are transmitted via the transceiver 122 or 129. The secure element 130 receives the packet(s) via the transceiver 134 or 136 (FIGS. 3A-3C) and disassembles the packet. An application (or corresponding API) running on the processor 132 (FIGS. 3A-3C) updates (444) the stored value of the secure element 130 by the amount specified in the packet. In some embodiments, the secure element 130 transmits a confirmation message (not shown) to the mobile communication device 110. If the mobile communication device 110 does not receive the confirmation message from the secure element 130, it retransmits the packet(s) as described in operation 442.

To purchase an item or gain entry to a venue or facility, the user brings the mobile communication device 110 with its attached secure element 130 into proximity with a POS or POE terminal 150. The terminal 150 requests (446) the amount of purchase (or entry) from the secure element 130. The secure element 130 receives this request directly from the terminal 150 via the transceiver 134 (or alternatively, 136). After authenticating the request, the secure element 130 debits its stored value by the requested amount and transmits (448) the requested amount to the terminal 150, which receives (450) the amount.

An application (or corresponding API) running on the processor 132 (FIGS. 3A-3C) of the secure element 130 creates (452) one or more messages (e.g., one or more SMS or MMS messages) with transaction data for the purchase (e.g., the amount, the date and time, identification of the terminal 150, etc.). The one or more messages are transmitted (452) by the transceiver 134 or 136 (FIGS. 3A-3C).

The listener application (e.g., listener application 631, FIG. 6) on the mobile communication device 110 listens on the specific port for messages. When it receives (456) the one or more messages at the specified port of the transceiver 122 (FIG. 2), it unpacks the message, confirms the messages, and displays the transaction data contained in the message to the user. The device 110 transmits (458) a copy of the transaction data to the management server 180 (not shown in FIG. 4C), which stores the transaction data. The device also sends a confirmation that it received the messages to the secure element 130.

Figure 4D:
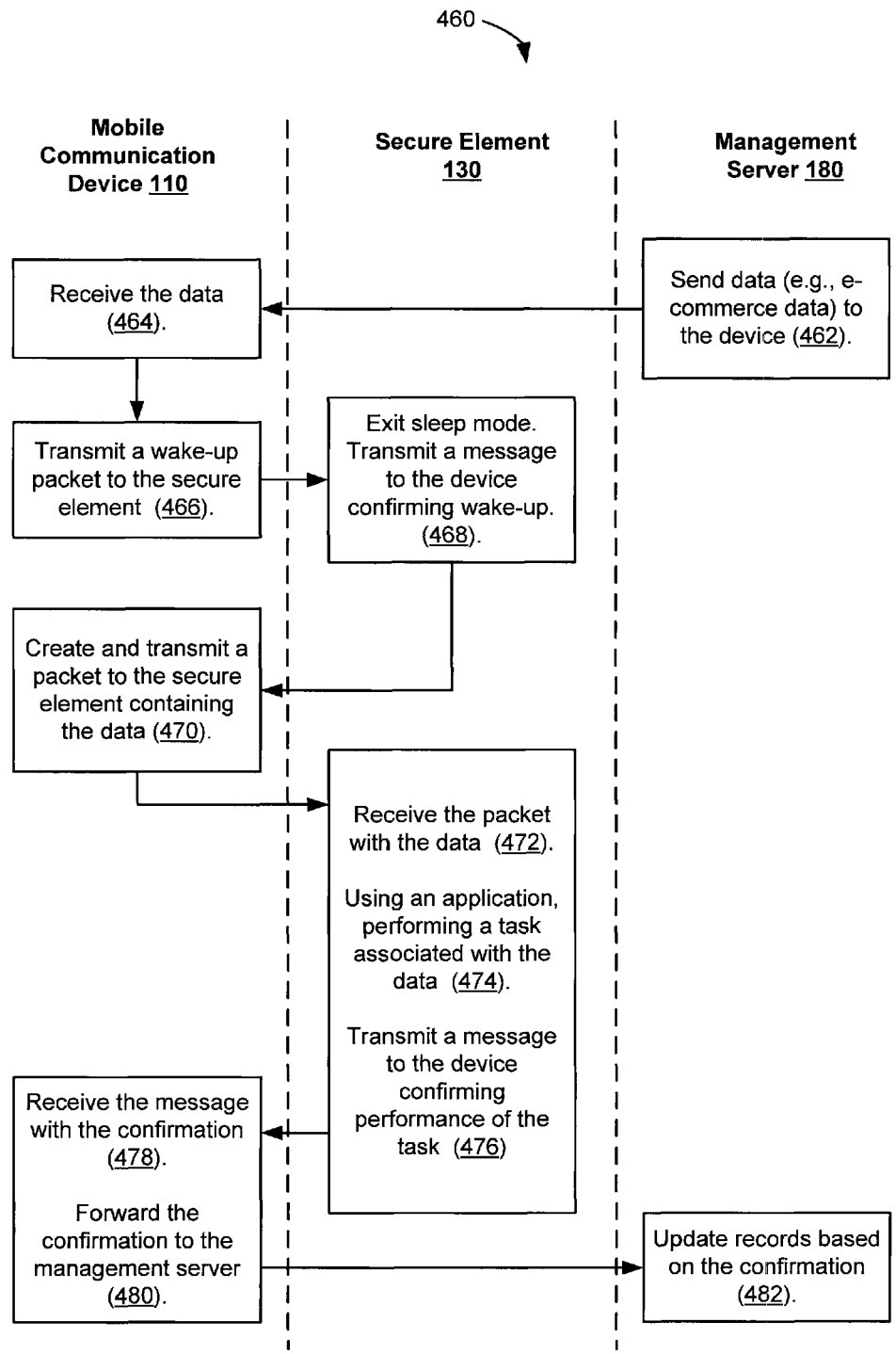
FIG. 4D is a flow diagram illustrating a method of transmitting e-commerce data to a secure element in accordance with some embodiments.

The method 440 of FIG. 4C thus illustrates a purchase performed using the device 110 and secure element 130. In some embodiments, data is provided to the secure element 130 for subsequent use or reference in a transaction such as the purchase of the method 440. FIG. 4D is a flow diagram illustrating a method 460 of providing data to a secure element 130 in accordance with some embodiments.

In the method 460, the management server 180 sends (462) data to the mobile communication device 110, which receives (464) the data. In some embodiments, the data is e-commerce data (e.g., a ticket, such as a ticket for a movie, concert, sporting event, airplane, bus, train, etc; a new value for a stored value card, credit card, or debit card; a coupon; or an advertisement). If the data includes a coupon, the coupon may include a merchant ID, promotion code, date of coupon delivery, time of coupon delivery, GPS coordinates associated with coupon delivery, etc. Other examples of the data include, but are not limited to, locations of smart posters; a code to unlock a door, computer, or vehicle; a code to start a vehicle, start a copy machine, withdraw funds from an ATM, or release medical records to a specific person or device; a list of authorized cell phone numbers, IMEI numbers, and/or serial numbers associated with secure elements for peer-to-peer funds transfer, or an instruction to disable the secure element 130 if the mobile device 110 has been reported as lost or stolen. The device 110 receives the data, for example, over a cellular network, via the transceiver 122, or over an Internet connection, via the transceiver 129. Instead of immediately forwarding the received data to the secure element 130, the device 110 first transmits (466) a wake-up packet to the secure element 130, in case the secure element 130 is in a sleep mode. The wake-up packet (e.g., an IP packet) is addressed to the identifier of the secure element 130 and is transmitted via the transceiver 122 or 129 (FIG. 2) using the IP address of the transceiver 134 or 136 of the secure element 130.

The secure element 130 receives the packet via the transceiver 134 or 136 (FIGS. 3A-3C) and, in response, exits sleep mode. The processor 132 (FIGS. 3A-3C) creates a message (e.g., an SMS or MMS message) confirming that the device has exited sleep mode and thus woken up. The message is transmitted (468) by the transceiver 134 or 136.

The mobile communication device 110 receives the message at the specified port of the transceiver 122 (FIG. 2). In response, the processor 123 (FIG. 2) creates (470) one or more packets (e.g., one or more IP packets) containing the data received in the operation 464. The one or more packets are addressed to the identifier of the secure element 130 and transmitted via the transceiver 122 or 129 (FIG. 2) using the IP address of the transceiver 134 or 136 of the secure element 130.

The secure element 130 receives (472) the packet(s) containing the data via the transceiver 134 or 136 (FIGS. 3A-3C) and disassembles the packet(s) to access the data. Using an application (e.g., an e-commerce application) or corresponding API running on the processor 132 (FIGS. 3A-3C), the secure element 130 performs (474) a task associated with the received data. For example, the data are stored in the memory 133. If the data contain an instruction to disable the secure element 130, the secure element 130 disables itself, thus preventing the secure element from being able to interact with a remote terminal (e.g., a POS or POE terminal 150). If the data contain a ticket (e.g., for a movie, concert, sports, airplane, bus, train, etc.) or coupon, the secure element 130 stores the ticket or coupon in the memory 133 and subsequently redeems the ticket or coupon at a POS or POE terminal 150, even if the mobile communication device 110 does not have network access and thus is offline. If the data contain instructions to increase or decrease the value of a stored value account, debit card, or credit card, the value as stored in the memory 133 is increased or decreased accordingly. If the data contain updates to information about a financial account (e.g. expiration date, billing address, etc), the information is updated in the memory 133. If the data include one or more user-defined payment limits, an e-commerce application on the secure element 130 uses the payment limits to prevent transactions above the limits or to require entry of a PIN code to authorize transactions above the limits. If the data include a list of authorized cell phone numbers, IMEI numbers, and/ or serial numbers associated with secure elements that are authorized for peer-to-peer transactions (e.g., funds transfers), the secure element 130 stores the list in the memory 133 and subsequently uses the list to perform peer-to-peer transactions with other secure-element-equipped mobile communications devices that are placed in proximity to the device 110. If the data include a access code (e.g., to provide access to a building, office, apartment, room, vehicle, safety deposit box, etc.), the secure element 130 stores the access code in the memory 133 and subsequently provides the access code to a POE terminal 150 to request access. If the data includes a code to operate an apparatus (e.g., a vehicle or electronic appliance such as a computer, copy machine, washing machine, ATM machine etc), the secure element 130 stores the code in the memory 133 and subsequently provides the code to a remote terminal associated with the apparatus to initiate use of the apparatus. If the data includes a code to provide access to computerized records (e.g., medical records), the secure element 130 stores the code in the memory 133 and subsequently provides the code to a computer to request access to the records.

The secure element creates and transmits (476) a message (e.g., an SMS or MMS message) to the mobile communication device 110 confirming that the task has been performed. The device 110 receives (478) the message at the specified port of the transceiver 122 (FIG. 2) and forwards (480) the confirmation to the management server 180, which updates (482) its records accordingly.

Figure 5:
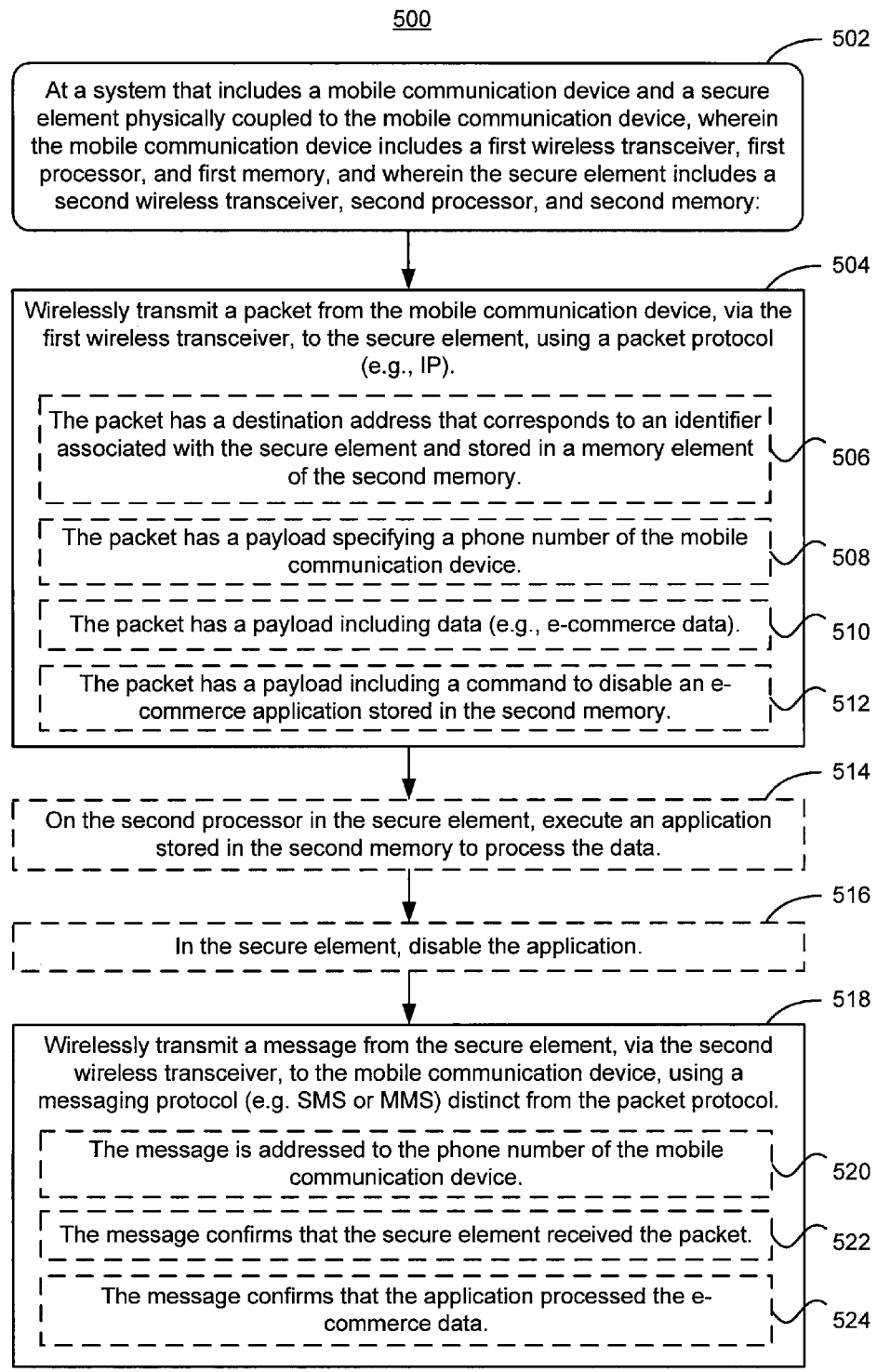
FIG. 5 is a flow diagram illustrating a method of communicating between a mobile communication device and a secure element in accordance with some embodiments.

FIGS. 4A-4D provide specific examples of how to use a mobile communication device 110 and associated secure element 130. Attention is now directed to a more generalized method of communication between a mobile communication device 110 and a secure element 130 that is physically coupled to the device 110. Specifically, FIG. 5 is a flow diagram illustrating a method 500 of communicating between a mobile communication device 110 and a secure element 130 in accordance with some embodiments.

The method 500 is performed at a system that includes a mobile communication device 110 and a secure element 130 physically coupled to the mobile communication device 110. The mobile communication device 110 includes a first wireless transceiver (e.g., the transceiver 122, FIG. 2), first processor (e.g., the processor 123, FIG. 2), and first memory (e.g., the memory 126, FIG. 2). In some embodiments, the mobile communication device 110 includes a plurality of transceivers (e.g., the transceivers 122 and 129, FIG. 2). The secure element 130 includes a second wireless transceiver (e.g., the transceiver 134 or 136, FIGS. 3A-3C), second processor (e.g., the processor 132, FIGS. 3A-3C), and second memory (e.g., the memory 133, FIGS. 3A-3C). In some embodiments, the secure element 130 includes a plurality of transceivers (e.g., the transceivers 134 and 136, FIGS. 3A-3C).

In the method 500, a packet (or a plurality of packets) is wirelessly transmitted (504) from the mobile communication device 110, via the first wireless transceiver, to the secure element 130, using a packet protocol (e.g., PPP, TCP/IP). In some embodiments, the packet has a destination address that corresponds (506) to an identifier associated with the secure element 130 (e.g., an IP address of the transceiver 134 or 136) and stored in a memory element (e.g., the memory element 138, FIGS. 3A-3C) of the second memory. For example, the destination address is the identifier. In some examples, all or a portion of the identifier is used as a private IP address assigned to the secure element. In some examples, the secure element 130 includes a chip (e.g. a smart chip 702, FIG. 3D), configured for near-field communications, that includes the second wireless transceiver, second processor, and second memory. Because the chip is configured for near-field communications, it is referred to as an NFC chip. The identifier is the serial number of the NFC chip: for example, the serial number of the NFC chip is 128 bits; these 128 bits are used as a 128-bit IP address of the secure element 130. This 128-bit IP address is used as the destination address in the header of TCP/IP packets sent to the secure element 130.

Examples of packets transmitted in the operation 504 include the packets transmitted in the operations 426 (FIG. 4B), 442 (FIG. 4C), 466 (FIG. 4D), and 470 (FIG. 4D)

In some embodiments, the packet has a payload specifying (508) a phone number of the mobile communication device (e.g., as for the operation 426, FIG. 4B).

In some embodiments, the packet has a payload including (512) a command to disable an application (e.g., an application 720, such as an e-commerce application) stored in the second memory (e.g., as described with respect to the operation 470, FIG. 4D). In response, the application is disabled (516) in the secure element 130 (e.g., in the operation 474, FIG. 4D).

The secure element 130 receives the packet via the second transceiver (e.g., transceiver 134, FIGS. 3A-3C), or alternatively via another transceiver distinct from the second transceiver (e.g., transceiver 136, FIGS. 3A-3C).

A message (or a plurality of messages) is wirelessly transmitted (518) from the secure element 130, via the second wireless transceiver, to the mobile communication device 110, using a standard messaging protocol (e.g. SMS or MMS) distinct from the packet protocol, or a variant of a standard messaging protocol. The message is transmitted, for example, using AT commands. In some embodiments, the message is addressed (520) to the phone number of the mobile communication device 110. In some embodiments, the first character of the message will include a unique identifier (e.g., a specific letter) to identify that the message has been sent from the secure element 130. The first character may be randomly generated according to a pre-determined algorithm to prevent spoofing.

Examples of messages transmitted in the operation 518 include the messages transmitted in the operations 430 (FIG. 4B), 452 (FIG. 4C), 468 (FIG. 4D), and 476 (FIG. 4D).

In some embodiments, the message confirms (522) that the secure element received the packet.

In some embodiments, the packet(s) have payload including (510) data (e.g., e-commerce data). Examples of data included in the payload include those data described with respect to operations 470 and 472 in the method 460 (FIG. 4D). An application stored in the second memory is executed (514) on the second processor in the secure element 130 to process the data (e.g., as in the operation 474, FIG. 4D). The message confirms (524) that the application processed the data (e.g., as in the operation 476, FIG. 4D).

In some embodiments, prior to the operation 518, the secure element 130 counts the number of characters to be used in the message. If the number of characters exceeds the number of characters allowed for the message using the messaging protocol, the secure element 130 does not transmit the message, but instead creates and transmits a packet with a payload larger than the number of characters allowed for the message using the messaging protocol. For example, an IP packet is created and transmitted. Alternatively, if the number of characters exceeds the number of characters allowed for the message using the messaging protocol, the secure element 130 creates and transmits a plurality of messages.

In some embodiments, the message provides transaction data (e.g., as in the operation 452, FIG. 4C). The transaction data are associated with an e-commerce or other transaction. For example, the message provides a receipt from an e-commerce transaction; the receipt includes, for example, a transaction number, transaction amount, transaction date, transaction time, merchant ID, merchant name, product id, product name, location of transaction/merchant, and/or cashier D. In another example, the message provides an indication of redemption of an electronic coupon. Other examples of transaction data are described with respect to operations 470-478 in the method 460 (FIG. 4D).

The mobile communication device 110 receives the message via the first transceiver (e.g., transceiver 122, FIGS. 3A-3C), or alternatively via another transceiver distinct from the first transceiver (e.g., transceiver 129, FIGS. 3A-3C). In some embodiments, the device 110 receives messages from a cellular service provider (e.g., forward by the cellular service provider but initially transmitted by another party) at a first port, and receives the message from the secure element 130 at a second port distinct from the first port.

In some embodiments, the secure element 130 receives power from a remote terminal (e.g., a POS or POE terminal 150, FIG. 1). For example, the secure element 130 receives power via RF signals transmitted by the remote terminal. The wireless transmission of the message in operation 518 is performed using the power received from the remote terminal when the secure element 130 is in proximity to the remote terminal. In other embodiments, the secure element 130 harvests power from ambient RF signals (e.g., using power harvesting circuitry 144, FIG. 3C). The wireless transmission of the message in operation 518 is performed using the harvested power. In still other embodiments, the secure element 130 includes a battery (e.g., a battery 140, FIG. 3B), and the wireless transmission of the message in operation 518 is performed using power from the battery. For example, the secure element 130 determines whether power is available from a nearby remote terminal. If power is not available from the nearby terminal, the message is wirelessly transmitted using power from the battery.

The method 500 thus allows for wireless bi-directional communication between a mobile communication device 110 and associated secure element 130 using a different protocol in each direction. While the method 500 includes a number of operations that appear to occur in a specific order, it should be apparent that the method 500 can include more or fewer operations, which can be executed serially or in parallel. An order of two or more operations may be changed and two or more operations may be combined into a single operation. For example, the order of the operations 504 and 518 may be reversed.

FIG. 6 is a block diagram illustrating a mobile communication device 110 (e.g., as shown in FIG. 2) in accordance with some embodiments. The device 110 includes a processor 123, one or more communications interfaces 614, memory 126, a user interface 612, and one or more communication buses 610 for interconnecting these components. The communication buses 610 may include circuitry that interconnects and controls communications between system components. The user interface 612 includes the display 124 and keypad 125. The communications interface 614 includes the transceiver 122 and, in some embodiments, the transceiver 129. The memory 126 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 126, or alternately non-volatile memory device(s) within the memory 126, includes a non-transitory computer-readable storage medium. While the memory 126 is shown as being separate from the processor 123, all or a portion of the memory 126 may be embedded in the processor 123. In some embodiments, the memory 126 stores the following programs; modules and data structures, or a subset thereof:

- an operating system 616 that includes procedures for handling various basic system services and for performing hardware dependent tasks;
- a communication module 618 that is used for communicating with other devices (e.g., with the secure element 130 and the management server 180, FIG. 1) via the communications interface 614; and
- applications 620, including one or more e-commerce applications 622 (e.g., ticketing applications; content, item and service purchase applications; and/or payment management applications), games 626, enterprise applications 628, and/or multimedia applications 630.

The communication module 618 includes a "listener" application 631 to listen on a specified port of a transceiver (e.g., the transceiver 122, FIG. 2) for messages from the secure element 130. The communication module 618 also stores an identifier 632 of a secure element 130 that is physically coupled to the mobile communication device 110, for use in transmitting packets to the secure element 130, and the phone number 634 of the mobile communication device 110, for use in receiving messages from the secure element 130.

Associated with the e-commerce application(s) 622 are corresponding APIs for processing data received from other devices (e.g., the secure element 130 and the management server 180, FIG. 1) and data to be transmitted to the other devices. Similar APIs may be associated with the other applications 626, 628, and/or 630.

In some embodiments, the non-transitory computer-readable storage medium of the memory 126 includes instructions for performing all or a portion of the operations shown in the "mobile device communication 110" columns in FIGS. 4A-4D (except for the attaching operation 412, FIG. 4A). Likewise, the memory 126 includes instructions for performing all or a portion of the operations 504-512 in the method 500 (FIG. 5).

Each of the above identified elements in FIG. 6 may be stored in one or more of the previously mentioned memory devices in the memory 126. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 126 may store a subset of the modules and data structures identified above. Furthermore, the memory 126 may store additional modules and data structures not described above.

Figure 7:
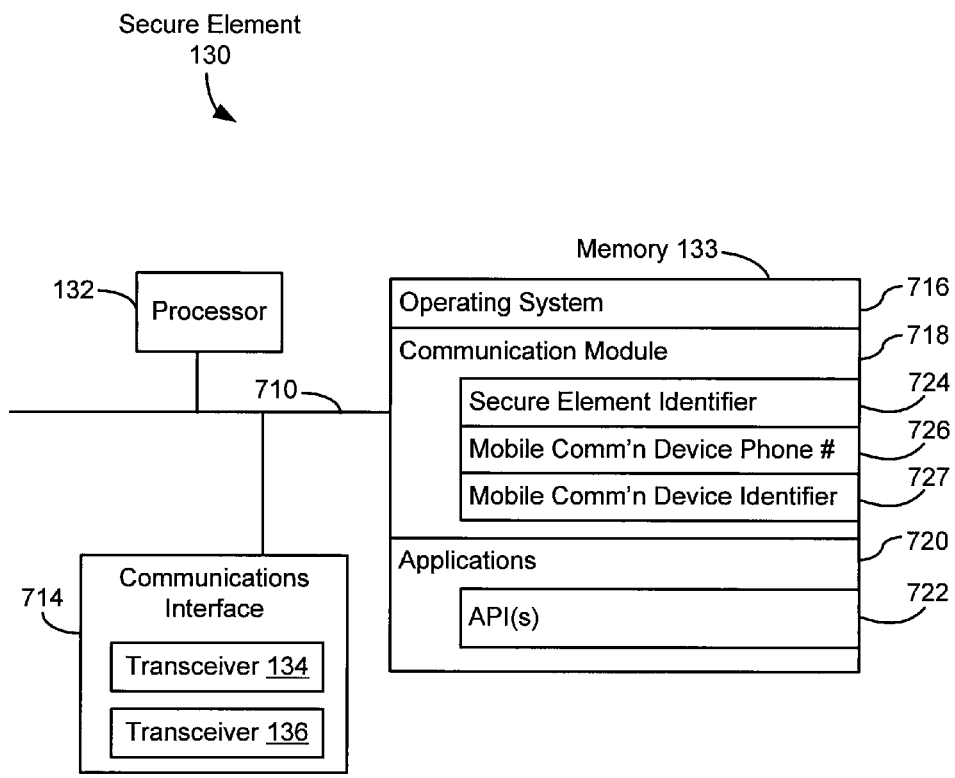
FIG. 7 is a block diagram illustrating a secure element to be physically coupled to a mobile communication device in accordance with some embodiments.

FIG. 7 is a block diagram illustrating a secure element 130 (e.g., as shown in FIGS. 3A-3E) in accordance with some embodiments. The secure element 130 includes a processor 132, one or more communications interfaces 714, memory 133, and one or more communication buses 710 for interconnecting these components. The communication buses 710 may include circuitry that interconnects and controls communications between components. The communications interface 714 includes the transceiver 134 and, in some embodiments, the transceiver 136. The memory 133 includes high-speed random access memory, such as DRAM, SRAM, DDR RAM and/or other random access solid state memory; and includes non-volatile memory, such as flash memory and/or other non-volatile storage. The memory 133, or alternatively non-volatile memory within the memory 133, includes a non-transitory computer-readable storage medium. While the memory 133 is shown as being separate from the processor 132, all or a portion of the memory 133 may be embedded in the processor 132. In some embodiments, the memory 133 stores the following programs, modules and data structures, or a subset thereof:

- an operating system 716 that includes procedures for handling various basic system services and for performing hardware dependent tasks;
- a communication module 718 that is used for communicating with other devices (e.g., with the mobile communication device 110 and with POS and POE terminals 150, FIG. 1) via the communications interface 714; and
- one or more applications 720 (e.g., e-commerce applications) and associated APIs 722.

The communication module 718 stores an identifier 724 of the secure element 130 (e.g., an identifier of the transceiver 134 or 136), for use in receiving packets from the mobile communication device 110 to which the secure element 130 is physically coupled, and also stores the phone number 726 and identifier 727 of the mobile communication device 110, for use in transmitting messages to the mobile communication device 110.

In some embodiments, the memory 133 includes instructions for performing all of the operations shown in the "secure element 130" columns in FIGS. 4A-4D (except for the attaching operation 412 and charging operation 414, FIG. 4A). Likewise, the memory 126 includes instructions for performing all or a portion of the operations 514-524 in the method 500 (FIG. 5).

Each of the above identified elements in FIG. 7 may be stored in one or more of the previously mentioned components of the memory 133. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 133 may store a subset of the modules and data structures identified above. Furthermore, the memory 133 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A system, comprising a mobile communication device and a secure element physically coupled to the mobile communication device, wherein: the mobile communication device comprises a first wireless transceiver, a first processor, and a first memory; the secure element comprises a second wireless transceiver, a second processor, and a second memory; the mobile communication device is configured to address packets to a serial number of the secure element and transmit point of sale (POS) transaction data via the first wireless transceiver to the secure element in the packets using a TCP/IP packet protocol; and the secure element is configured to address messages to a phone number of the mobile communication device and transmit data via the second wireless transceiver to the mobile communication device in the messages using an SMS messaging protocol; and wherein the secure element is configured to use power received from a POS device to transmit the messages to the mobile communication device.

2. The system of claim 1, wherein the secure element is adhesively attached to the mobile communication device.

3. The system of claim 1, wherein the secure element is configured to detect the availability of a carrier network and to transmit the messages using the carrier network in response to detecting availability of the carrier network.

4. The system of claim 1, wherein:
the second memory of the secure element comprises a memory element to store an identifier associated with the secure element; and
the packets comprise a destination address corresponding to the identifier.

5. The system of claim 4, wherein:
the secure element comprises an NFC chip, the NFC chip comprising the second wireless transceiver, second processor, and second memory; and
the identifier comprises a serial number of the NFC chip.

6. The system of claim 1, wherein:
the first memory of the mobile communication device stores an application that, when executed by the first processor, generates the packets and transmits the packets via the first transceiver; and
the second memory of the secure element stores an application that, when executed by the second processor, generates the messages and transmits the messages via the second transceiver.

7. The system of claim 6, wherein:
the first memory is configured to store data to be transmitted to the secure element in the packets and data received from the secure element in the messages; and
the second memory is configured to store data to be transmitted to the mobile communication device in the messages and data received from the mobile communication device in the packets.

8. The system of claim 1, wherein the mobile communication device further comprises:
a first port to receive, from a cellular service provider, messages compatible with the messaging protocol; and
a second port, distinct from the first port, to receive the messages from the secure element.

9. The system of claim 1, wherein the mobile communication device further comprises:
a first port to receive, from a cellular service provider, messages compatible with the messaging protocol and to receive the messages from the secure element.

10. A method of communicating between a mobile communication device and a secure element physically coupled to the mobile communication device, wherein the mobile communication device comprises a first wireless transceiver, a first processor, and a first memory, and wherein the secure element comprises a second wireless transceiver, a second processor, and a second memory, the method comprising:
addressing packets to a serial number of the secure element; wirelessly transmitting the packets including point of sale (POS) transaction data from the mobile communication device, via the first wireless transceiver, to the secure element using a TCP/IP packet protocol;
addressing messages to a phone number of the mobile communication device and wirelessly transmitting the messages from the secure element, via the second wireless transceiver, to the mobile communication device using an SMS messaging protocol; and wherein the secure element is configured to use power received from a POS device to transmit the messages to the mobile communication device.

11. The method of claim 10, wherein:
the packet comprises a payload comprising a phone number of the mobile communication device;
the message provides a confirmation that the secure element received the packet; and
wirelessly transmitting the message comprises addressing the message to the phone number.

12. The method of claim 11, wherein a first character of the message is an identifier corresponding to the secure element.

13. The method of claim 10, wherein:
the packet comprises a payload;
the method further comprises executing an application on the second processor of the secure element to process data in the payload; and
the message provides a confirmation that the application has processed the data.

14. The method of claim 10, wherein:
the second memory of the secure element stores an e-commerce application; and
the packet comprises a payload comprising a command to disable the e-commerce application.

15. The method of claim 10, wherein the message provides a receipt from an e-commerce transaction.

16. The method of claim 10, wherein the message provides transaction data associated with an e-commerce transaction.

17. The method of claim 10, wherein:
the packet comprises a payload comprising an electronic coupon; and
the message provides an indication of redemption of the electronic coupon.

18. The method of claim 10, wherein the secure element is adhesively attached to the mobile communication device.

19. The method of claim 10, further comprising storing an identifier associated with the secure element in a memory element of the second memory of the secure element, wherein the packet comprises a destination address corresponding to the identifier.

20. The method of claim 19, wherein:
the secure element comprises an NFC chip, the NFC chip comprising the second wireless transceiver, second processor, and second memory; and
the identifier comprises a serial number of the NFC chip.

21. The method of claim 20, wherein the identifier comprises a private IP address assigned to the secure element.

22. The method of claim 10, further comprising storing an identifier associated with the second wireless transceiver of the secure element in a memory element of the second memory of the secure element, wherein the packet comprises a destination address corresponding to the identifier.

23. The method of claim 10, further comprising:
at a first port of the mobile communication device, receiving messages compatible with the messaging protocol from a cellular service provider; and
at a second port of the mobile communication device, receiving the message transmitted from the secure element using the messaging protocol, wherein the second port is distinct from the first port.

* * * * *